US012680860B2

(12) United States Patent
Sukalski et al.

(10) Patent No.: US 12,680,860 B2
(45) Date of Patent: Jul. 14, 2026

(54) SYSTEMS AND METHODS FOR MEASUREMENT OF A VEHICLE LOAD

(71) Applicant: Illinois Tool Works Inc., Glenview, IL (US)

(72) Inventors: Andrew Sukalski, Fairmont, MN (US); Thomas H. Johnson, Winnebago, MN (US); Kevin Detert, Fairmont, MN (US)

(73) Assignee: Illinois Tool Works Inc.

( * ) Notice: Subject to any disclaimer, the term of this patent is extended or adjusted under 35 U.S.C. 154(b) by 559 days.

(21) Appl. No.: 18/155,188

(22) Filed: Jan. 17, 2023

(65) Prior Publication Data

US 2023/0236060 A1 Jul. 27, 2023

Related U.S. Application Data

(60) Provisional application No. 63/303,598, filed on Jan. 27, 2022.

(51) Int. Cl.
| | |
|---|---|
| *G01G 19/08* | (2006.01) |
| *B66F 9/075* | (2006.01) |
| *G01G 23/00* | (2006.01) |
| *G01M 1/12* | (2006.01) |

(52) U.S. Cl.
CPC .......... *G01G 19/08* (2013.01); *B66F 9/0755* (2013.01); *G01G 23/00* (2013.01); *G01M 1/122* (2013.01)

(58) Field of Classification Search
CPC ......... B66F 9/0755; B66F 9/24; G01G 19/08; G01G 19/083; G01G 23/00; G01M 1/122
See application file for complete search history.

(56) References Cited

U.S. PATENT DOCUMENTS

| | | | | |
|---|---|---|---|---|
| 5,917,159 | A * | 6/1999 | Kostiuk ............. | G01G 23/3728 |
| | | | | 177/136 |
| 10,654,697 | B2 * | 5/2020 | Houle ................... | B66F 17/003 |
| 2010/0204891 | A1 * | 8/2010 | Biggerstaff ........... | E02F 9/2033 |
| | | | | 701/50 |
| 2021/0214205 | A1 * | 7/2021 | Strong ...................... | B66F 9/24 |

(Continued)

FOREIGN PATENT DOCUMENTS

| | | |
|---|---|---|
| EP | 2107035 | 10/2009 |
| JP | 2001163597 A * | 6/2001 |

OTHER PUBLICATIONS

Int'l Search Report and Written Opinion Appln No. PCT/US2023/060842 mailed Jun. 7, 2023.

*Primary Examiner* — Natalie Huls
(74) *Attorney, Agent, or Firm* — MCANDREWS HELD & MALLOY, LTD.

(57) ABSTRACT

The present disclosure provides an onboard object measurement system for a vehicle, such as a lift truck. The vehicle may have one or more sensors incorporated thereon, such as within one or more load handling fixtures. Control circuitry associated with the vehicle and/or the sensors is configured to receive data from the first sensor corresponding to changes in force in the first axis, receive data from the second sensor corresponding to changes in force in the second axis, correlate the changes in force along the first and second axes, and to determine one or more of a direction of motion, a thrust, or a position of a center of gravity associated with the load based on the correlation.

13 Claims, 3 Drawing Sheets

(56) References Cited

U.S. PATENT DOCUMENTS

| | | | | |
|---|---|---|---|---|
| 2022/0107238 A1* | 4/2022 | Nikolaou | .............. | G01M 1/122 |
| 2022/0301215 A1* | 9/2022 | Detert | ....................... | G06T 7/73 |
| 2022/0340404 A1* | 10/2022 | Sukalski | ................... | B66F 9/24 |
| 2023/0373497 A1* | 11/2023 | Hattori | .................... | B60T 8/172 |

* cited by examiner

SYSTEMS AND METHODS FOR MEASUREMENT OF A VEHICLE LOAD

RELATED APPLICATIONS

The present application claims the benefit of, and priority to, U.S. Provisional Application No. 63/303,598, filed Jan. 27, 2022, entitled "Systems And Methods For Measurement Of A Vehicle Load." The complete subject matter and contents of App. Ser. No. 63/303,598 are incorporated herein by reference in their entireties.

BACKGROUND

Vehicles such as lift trucks can be configured to support loads of varying sizes and shapes. For example, a lift truck may transport an object within a warehouse or other area. However, issues exist with carriage or loading of different objects, such as complications with securing, transporting, and/or arranging multiple objects of different shapes on the lift truck and/or in a storage area. Accordingly, there is a need for an onboard measurement system to determine properties of a loaded object.

SUMMARY

Disclosed is an onboard object measurement system for a vehicle, such as a lift truck. The vehicle may have one or more sensors configured to measure changes in force along a first, second, and/or third axis in response to one or more movements of a load (e.g., forces of gravity acting on the load, placement on a scale, pitching the load in one or more directions, etc.). Control circuitry receives data from the sensors corresponding to changes in force and/or moment in the first, second, and/or third axis, and correlates the changes in force and/or moment along the first, second, and/or third axes. The control circuitry then determines one or more of a direction of motion, a thrust, or a center of gravity (e.g., a position of the load center of gravity in one or more of three dimensions) associated with the load based on the correlation, information which enables improved movement and/or storage of the load, as well as generating a response to an imbalance of the load on during transit and/or loading.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1:
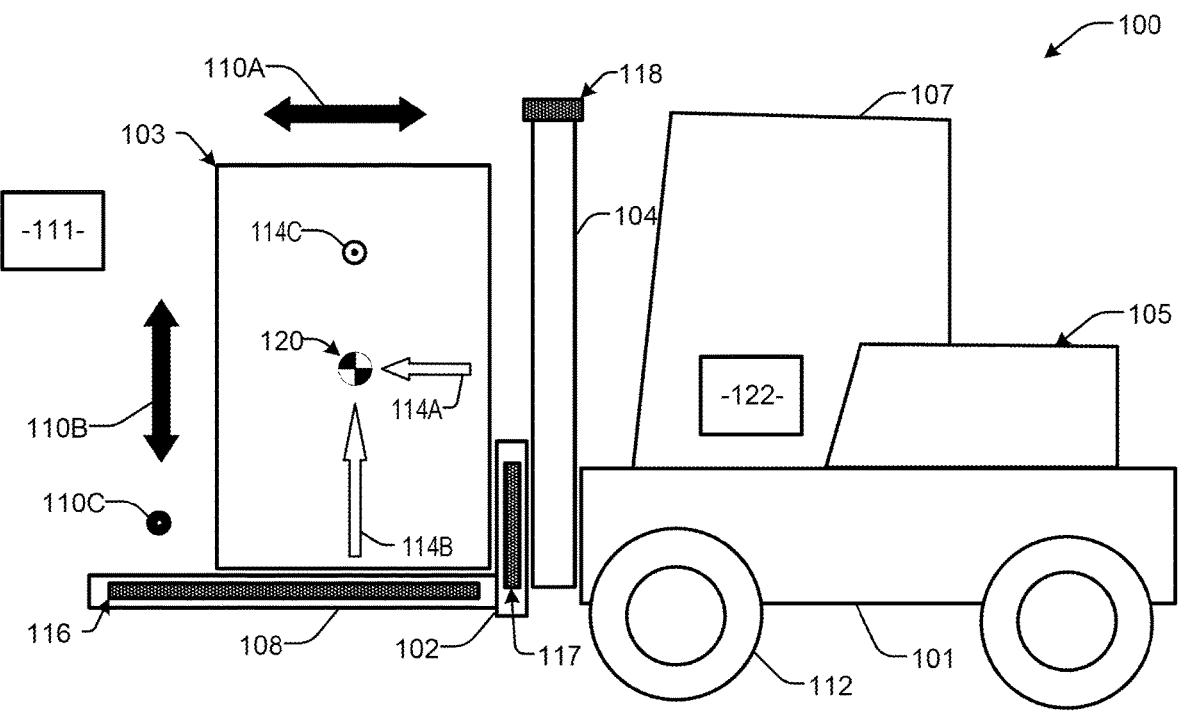
FIG. 1 is a diagrammatic illustration of an example measurement system for a vehicle, in accordance with aspects of this disclosure.

The present disclosure provides a measurement system for a vehicle that includes a first sensor configured to measure changes in force along a first axis in response to movement of a load and a second sensor configured to measure changes in force along a second axis in response to movement of the load. Control circuitry associated with the vehicle and/or the sensors is configured to receive data from the first sensor corresponding to changes in force in the first axis, receive data from the second sensor corresponding to changes in force in the second axis, correlate the changes in force along the first and second axes, and to determine one or more of a direction of motion, a thrust, or a center of gravity associated with the load based on the correlation.

Many massive objects have a center of gravity that does not align with a geometric center of the object. In shipping, for example, parcels may house one or more objects with a complex geometry and/or are arranged within such that the center of gravity is offset from the geometric center of the parcel's external dimensions.

Transport, storage, and/or loading of objects gain advantages by employing a knowledge of the objects' center of gravity. For example, information on the center of gravity can be used to determine how best to arrange an object and/or grouping of objects on a loading platform (e.g., a pallet, a container, etc.) and/or on a carrier vehicle (e.g., a lorry, aircraft, etc.) to ensure stability of the object(s), the loading platform, and/or the vehicle during transport.

Objects are often transported and/or loaded on a vehicle, such as a forklift. In some examples, the forklift may be equipped with one or more sensors configured to measure the object weight. However, conventional systems employing sensors are limited in their ability to monitor and/or determine other characteristics of the object. For example, center of gravity calculations are not possible on typical forklift scales, as the center of gravity is outboard of the sensors (e.g., load cells) and not between them.

In disclosed examples, one or more sensors are configured for calibration to enable measurement and/or calculation of the object's moment. This moment data can be used in conjunction with weight to determine where the center of gravity is on the object. In some examples, data collected by the sensors, including but not limited to moment, can be used to measure and/or calculate characteristics of the object corresponding to weight, mass, or balance, in addition to or in the alternative of center of gravity.

Additionally, a system employing the one or more sensors may be operated to determine a vertical component, for example, a height at the center of gravity of the object. For instance, the system may be configured to move (e.g., pitch the object/load forward and/or backward, side to side, etc.) by a predetermined amount (e.g., a predetermined distance, a predetermined degree, etc.) to calculate and/or determine the height of the center of gravity. Advantageously, the center of gravity (e.g., a position of the center of gravity in three dimensions) can be measured, calculated, and/or otherwise determine while the object is loaded on the forklift scale (e.g., via an onboard weighing systems).

Advantageously, a loading process can be implemented with a calculated rather than estimated load center of gravity. This allows for an increase in capacity for transport of loads and/or balancing of loads based on center of gravity rather than external dimensions alone. In some examples, the system can be configured to additionally or alternatively determine an object's center of mass, balance point, and/or centroid, as a list of non-limiting examples.

In some additional or alternative examples, a system can employ sensors to determine a relative stability of a loaded object. For instance, the object may be supported on one or more load handling fixtures (or loading platforms) coupled to a scale and associated sensors. As disclosed herein, the object's centroid of mass can be monitored relative to an orientation and/or position of the load handling fixtures to determine a relative stability of the object. For example, the system monitors for changes in force(s) acting on the object, and compares the changes to one or more threshold values. If the changes exceed one or more threshold values, the system may determine that the object is unstable (e.g., moving, shifting, etc.) on the load handling fixtures. In response, the system may generate an alert, and/or control one or more sub-systems to adjust a state and/or operation to prevent movement of the object.

In some examples, information corresponding to a weight, center of gravity, center of mass, balance point, external dimensions, and/or centroid, can be assigned to an object. As the object is being loaded or prepared for loading (e.g., for storage and/or transport), the location and/or proposed location of each object can be mapped. For example, the system can generate a cargo profile for a loading area based on the information for each object.

In some examples, the loading area is a virtual loading area, the cargo profile corresponding to a pre-loading plan. Thus, an optimized location and/or arrangement for each object can be predetermined, such that loading of the objects in the loading area identified in advance.

In some examples, the objects are physically loaded and/or arranged within the loading area, and the cargo profile is generated during the loading process. The cargo profile can be dynamic, such that as additional objects are loaded, arrangement of previously loaded and/or newly loaded objects is determined. In some examples, the cargo profile is generated as a map of the loading area, such that information for each object, including location within the loading are, is recorded.

As a result, loading operations and/or object placement can be optimized for space and/or weight distribution. The optimization may incorporate considerations for axle balancing, center of gravity of the loading area (e.g., container, trailer, cargo bay, etc.), and/or load height, as a list of non-limiting examples. Optimization can be used to calculate arrangements for the objects to improve transport system fuel economy, increase vehicle stability, and balance vehicle weight, among other advantages.

In some examples, the object information can be analyzed (e.g., by an artificial intelligence (AI) and/or machine learning (ML) system) to calculate operating guidelines for transport vehicles, such as braking distances, acceleration thresholds, grade-limitations, etc. In examples, the vehicle can be any used for cargo transport, including trucks, trailers, aircraft, seafaring vessels, etc.

Conventional load balancing applications (e.g. for aircraft) do not acquire center of gravity and/or vertical height locations, and therefore make assumptions as to the height of the center of gravity/mass (e.g. typically half the object/load height). Advantageously, the disclosed system provides measurements at the cargo area and/or as objects are loaded (e.g., via an onboard system), and thereby avoids reliance on stand-alone, single-purpose scales for determining center of gravity.

In disclosed examples, the system is configured to employ the sensors to measure forces acting on the object from one or more sides. For example, one or more external forces may impact the object, such as being struck and/or during movement of the vehicle upon which the object is loaded. The external forces acting on the object can be measured and/or compared to one or more threshold values. Based on a comparison between the external forces (and/or the change in those forces) and one or more threshold values, the system can determine if the object (and/or the vehicle) is in motion, and/or whether the object (e.g., center of gravity) has shifted. The system can further determine an acceleration and/or in which direction the object and/or vehicle is moving.

In some disclosed examples, the system is configured to use the sensors to correct a weight measurement based on an angle determination. For example, weight of an object is typically calculated using sensors that measure a vertical force component. However, to accurately measure the weight, a correction must be applied when the scale is not vertically aligned (e.g., angled forward, backward, left, right) due to pitching of the mast, an uneven floor, etc. This correction is determined by measuring roll and/or pitch angles acting on the object and/or vehicle, and calculating a correction factor. The correction factor can be determined without the use of a pitch angle sensor by measuring an end and/or thrust force acting on the object, and calculating the root sums square. Similarly, roll angle sensor data can be replaced by measurements of forces acting on the object from the sides of the object.

Accordingly, the disclosed examples provide an onboard measurement system with increased flexibility and applicability, while allowing for movement of object and/or the vehicle. As a result, warehousing and/or loading of freight or other objects may realize increased efficiencies, such as a reduction of transport routes and optimization of trailer space.

Further, by expanding the amount and/or type of objects available for measurement (without requiring measurement in a single, static location), errors associated with estimating the weight, size and/or shape of the objects can be reduced or eliminated. As a result, placement in storage and/or transport containers can be optimized to balance a load or multiple loads.

In disclosed examples, a measurement system for a vehicle includes a first sensor configured to measure forces or changes in forces acting on a load along a first axis; a second sensor configured to measure forces or changes in forces acting on a load along a second axis; and control circuitry configured to: receive data from the first sensor corresponding to the force or the changes in force in the first axis; receive data from the second sensor corresponding to the force or the changes in force in the second axis; correlate the forces or the changes in force along the first and second axes; and determine one or more of a direction of motion, a thrust, or a center of gravity in the first or second axes associated with the load based on the correlation.

In some examples, the first axis is orthogonal to the second axis.

In some examples, the vehicle is a forklift truck. In examples, the forklift truck is configured to: secure the load on one or more load mounting fixtures; and adjust a position or orientation of the load by a predetermined amount resulting in a change of force on the load, wherein each of the first and second sensors are configured to measure changes in forces along the first and second axes, respectively, in response to the adjustment.

In some examples, the control circuitry is further configured: receive the measured changes in the forces along the first and second axes; and calculate a position of the center of gravity along the first axis or the second axis within the load based on a correlation of the measured changes.

In some examples, a third sensor configured to measure changes in force along a third axis. In examples, the third axis is orthogonal to both the first axis and the second axis.

In some examples, the control circuitry is further configured to: measure the changes in force along the first and second axes continually, periodically, or in response to a command; and compare the changes in force along the first axis or the second axis to one or more threshold values.

In some examples, the control circuitry is further configured to control one or more systems to adjust one or more operating parameters in response to a determination that the changes exceed a first threshold value of the one or more threshold values.

In some examples, the vehicle is a forklift truck, and wherein the one or more systems includes a drive mechanism, a load handling fixture, or a lift carriage.

In some examples, the one or more operating parameters includes adjusting speed of the forklift, a position or orientation of the load handling fixture, or a position or orientation of the lift carriage.

In some examples, the control circuitry is further configured to determine changes in the forces along the first axis or the second axis relative to motion of the vehicle.

In some examples, the vehicle is an autonomous vehicle.

In some disclosed examples, a measurement system for a vehicle comprising:

a first sensor configured to measure forces or changes in forces acting on a load along a first axis; a second sensor configured to measure forces or changes in forces acting on a load along a second axis; and control circuitry configured to: receive a weight measurement for each load from the first and second sensors; receive a center of gravity for each load from the first and second sensors; assign a corresponding weight and center of gravity to each load; and generate a cargo profile for a loading area based on one or more of the weight, the center of gravity, a location, size, or shape of each load for the loading area.

In some examples, the loading area is a virtual loading area, the cargo profile corresponding to a pre-loading plan.

In some examples, the plurality of loads are physically arranged within the loading area.

In some examples, the control circuitry is further configured to: measure the changes in force on the load along the first and second axes continually, periodically, or in response to a command; compare the changes in force along the first axis or the second axis to one or more threshold values; and determine a direction of the vehicle or the load based on the measured changes in the forces when the changes along the first axis or the second axis exceed a threshold value of the one or more threshold values.

In some examples, the control circuitry is further configured to determine changes in the forces along the first axis or the second axis relative to motion of the vehicle.

In some examples, the control circuitry is further configured to perform a calibration operation to determine an initial location, height, weight, or center of gravity for the load.

In some disclosed examples, a measurement system for a forklift comprising: a first sensor integrated with the forklift configured to measure forces or changes in forces acting on a load along a first axis; a second sensor integrated with the forklift configured to measure forces or changes in forces acting on a load along a second axis in response to movement of the load on the forklift; and control circuitry configured to: receive data from the first sensor corresponding to changes in force in the first axis; receive data from the second sensor corresponding to changes in force in the second axis; correlate the changes in force along the first and second axes; and determine one or more of a height, a direction of motion, a thrust, or a position of a center of gravity in the first axis, the second axis, or a third axis associated with the load based on the correlation.

In some examples, the forklift truck is configured to: secure the load on one or more load mounting fixtures; and adjust a position or orientation of the load by a predetermined amount, wherein each of the first and second sensors are configured to measure changes in forces along the first and second axes, respectively, in response to the adjustment.

In some examples, the first axis is a vertical axis and the second axis is a horizontal axis, the control circuitry further configured to: determine a weight value based on the measurements corresponding to the vertical axis; compare the changes in force along the horizontal axis to one or more horizontal threshold values; and determine a geometric sum for the vertical axis based on the changes in force along the horizontal axis exceeding the one or more horizontal threshold values; and apply the geometric sum calculate a corrected weight value.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" may be used to enumerate different components or elements of the same type, and do not necessarily imply any particular order.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, micro-processors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

Turning now to the drawings, FIG. 1 illustrates a side view of an example area onboard measurement system 100, in accordance with aspects of this disclosure. In the example of FIG. 1, the system 100 employs a vehicle 105, which includes one or more of a lift truck carriage 104, a lift truck carriage mount 102, and one or more forks or load handling fixtures 108 to support and/or manipulate a load. A chassis 101 supports the vehicle components via one or more wheels 112. An operator can command the lift truck attachment system 100 to perform an object measurement operation, while controlling the system to raise, lower, and/or manipulate the object, freight, and/or load 103.

In some examples, a control circuitry or system 122 is included and configured to control one or more components of the system to implement one or more of monitoring, measuring, analyzing, and/or generating an output corresponding to a measurement operation. As provided in greater detail with respect to FIG. 4, the control circuitry 122 may contain a processor 150, memory storage device 156, one or more interfaces 154, a communications transceiver 152, an energy storage device 160, and/or other circuitry (e.g., control system 164) to control the system 100. In some examples, the system 100 is powered by one or more of batteries, an engine, solar or hydrogen cell, and/or mains power, as a non-limiting list of examples. In some examples, one or more of the system components (e.g., sensors 116, 117, 118) are provided power via electrical conductors and/or wireless power coupling (e.g., inductive power transmission).

The system 100 can include one or more sensors configured to sense, monitor, and/or measure one or more properties (e.g. weight, acting forces, position/orientation of the object) or dimensions of the object 103. As shown in the example of FIG. 1, a first sensor 116 is arranged, embedded, incorporated, or otherwise associated with load handling fixtures 108. A second sensor 117 is arranged, embedded, incorporated, or otherwise associated with the carriage mount 102, and may include a sensor system comprised of multiple sensors (e.g., transducers, strain gauges, etc.). A third sensor 118 is arranged, embedded, incorporated, or otherwise associated with the mast 104. Although illustrated in example FIG. 1 as being located in particular positions on the vehicle 105, one or more of the sensors 116, 117, 118 may be arranged on other structures of the vehicle, such as the chassis 101 and/or the cab 107, as well as nearby equipment and/or other vehicles, as a list of non-limiting examples. Further, although illustrated as including three sensors 116, 117, 118, each sensor may comprise two or more sensors, one or more additional sensors may be added, or a single sensor may be employed.

A measurement operation may incorporate data from sensors external to the system 100. In additional or optional examples, one or more sensors 111 can be included to extend from a surface and/or other structure (e.g., wall, pillar, etc.), either retractable or fixed, to capture additional object and/or vehicle data (e.g., height, size, geometry, distance from the mast 104, etc.) as an object/vehicle moves by. Although illustrated examples represent the various sensors in a particular location, arrangement, or number, the various sensors may be arranged in any location or orientation within the area, and in any number to support a given operation. Moreover, although illustrated examples represent the system 100 being implemented in a forklift truck, additional or alternative implementations can employ a variety of vehicles and/or scales. For instance, the vehicle and/or scale may include a surface/platform to support one or more loads, with associated sensors to provide measurements on multiple axes, as disclosed herein. Such a surface/platform may be configured to shift along one or more of the axes to receive sensor data responsive to changes in force therefrom, as disclosed herein.

In some examples, the sensors 116, 117, 118 are one or more types of force sensor (e.g., a strain gauge, an accelerometer, and inertial measurement unit, etc.) which, when activated, provides a signal(s) corresponding to a force acting on the object 103. In this manner, the sensors 116, 117, 118 capture data corresponding to one or more properties (e.g., height, center of gravity, etc.) of the object without the need for stopping at a fixed-location scale.

During a measurement operation, one or more of the sensors (e.g., 111, 116, 117, 118) are activated, capturing measurements and/or data associated with one or more properties (e.g., weight, movement, applied forces, etc.) of the object 103 and/or dimensions (e.g., length, width, angle, etc.) of one or more surfaces of the object 103. The data corresponding to the measurements are transmitted (via wired and/or wireless communications) to the control circuitry 122 for analysis.

In some examples, the sensors can capture a variety of parameters and/or characteristics of the object, thus can be one or more of image capture devices, such as a vision based camera, infrared camera, or a laser detector, a radar system, an acoustic sensor, an image capture system, a laser based system, an acoustic sensor, a light detection and ranging (LIDAR) system, a microwave system, etc. as a list of non-limiting examples.

The control circuitry 122 may be configured to receive data (e.g., force data, dimensions, measurements, etc.) from the sensors (e.g., 111, 116, 117, 118), such as by a digital and/or analog data signal. The control circuitry 122 is configured to calculate, estimate, and/or otherwise determine one or more properties (e.g., weight, movement, applied forces, etc.) of the object 103 and/or one or more dimensions (e.g., shape, volume, orientation, size, area, etc.) of one or more surfaces of the object 103 based on the data.

In an example, the system 100 is configured to move the object

An operator can command the lift truck to perform an object measuring operation by controlling the system to raise, lower, turn, angle, pitch, and/or otherwise manipulate the object, freight, and/or load (e.g., object 103).

A measuring operation may be performed using additional or alternative systems, such as employing data from AI and/or ML systems, autonomous vehicle systems, as a list of non-limiting examples.

In some examples, devices and/or components (not shown) may be connected to provide signals corresponding to the output from the sensors 116, 117, 118 for analysis, display, and/or recordation, for instance.

The sensors 116, 117, and/or 118 are arranged to capture data corresponding to object dimensions, such as during a loading or unloading operation.

In some examples, sensors (e.g., similar to sensors 116, 117 and/or 118) can be employed in an area, such as warehouse environments. A similar object measuring operation can be implemented in such an area.

Although some examples are represented as fork lift trucks, the concepts disclosed herein are generally applicable to a variety of vehicles (e.g., lorries, carts, etc.) and/or lift modalities (e.g., "walkie stackers," pallet jacks, etc.) to determine a property of a load.

Center of Gravity/Moment Sensing

With reference to FIG. 1, in an example object measurement operation, the system 100 is configured for a first sensor (e.g., sensor 116) to measure forces and/or changes in force 114B along a first axis (e.g., generally the y-axis 110B). A second sensor (e.g., sensor 117) to measure changes in force 114C along a second axis (e.g., generally the z-axis 110C). For instance, the load 103 may be placed onto the load mounting fixtures 108, may shift during loading and/or transport, and/or may be struck by an external object or force. In examples, the load 103 may be moved (e.g., in a predetermined motion or series of motions) and the sensor(s) can measure the changes in forces acting on the load along one or more axes in response to the movement. In examples, the sensor(s) can measure the forces of gravity acting on the load, such as when a load is placed on the system and is held substantially static during the measurement operation.

In some examples, the first and/or second sensor is configured to measure changes in forces 114A, 114B, 114C in multiple axes (e.g., generally the x-axis 110A, y-axis 110B, z-axis 110C, respectively). In some examples, a single sensor (or sensor system) can be employed to measure changes in forces in multiple axes. For instance, sensor 117 may be a sensor system including one or more sensors (e.g., transducers, strain gauges, etc.), which may measure forces on the load individually or together. The resulting measurements may then be used to determine the object's weight, center of gravity 120, position, and/or orientation.

In a situation where each load mounting fixtures 108 contained a unique sensor 116A and 116B, respectively, data collected from the two sensors may be compared against one another and/or stored data to determine a shift in the object's center of gravity 120, position, and/or orientation.

The control circuitry 122 receives the data from the first and second sensors corresponding to forces and/or changes in force acting on the object 103, correlate the forces and/or changes in force along the first, second, and/or third axes, and determine one or more of a center of gravity (e.g., the center of gravity in one or more of three dimensions in space), a direction of motion, or a thrust associated with the load based on the correlation.

In some examples, once the load is secured on one or more load mounting fixtures, a position or orientation of the load 103 can be adjusted, such as by a controlled movement of the vehicle 105 (e.g., by movement of the wheels 112), the carriage 102, the mast 104, and/or the load mounting fixtures 108. The sensors 116, 117, 118 are configured to measure forces and/or changes in forces 114A, 114B, 114C along the first, second and/or third axes 110A, 110B, 110C, respectively, in response to the adjustment.

The sensor measurements are transmitted to the control circuitry 122 where one or more properties (e.g., the center of gravity, the location of the center of gravity in one or more of the three axes, etc.) of the object 103 are calculated or otherwise determined, based on a correlation of the measured changes.

In some examples, the first axis is generally orthogonal to the second axis, and the third axis is generally orthogonal to one or both the first and second axes.

In conventional systems, calculation of center of gravity is not possible on forklift scales, as the center of gravity is outboard of the sensors, not between them. As disclosed herein, sensors can be calibrated to measure moment of the object in motion. This moment data is used in conjunction with other object data (e.g., weight, size, position, etc.) to determine where the center of gravity is located. Additionally, conventional center of gravity scales are incapable of determining the vertical component (e.g., height) of the center of gravity. By adjusting (e.g., pitching) the load forward/backward and/or side-to-side by several degrees and/or centimeters, the height of the center of gravity of the object arranged on the forklift scale can be measured and/or calculated.

Advantageously, vehicle load capacity and/or storage planning can be more accurately determined, as measured properties such as weight and the center of gravity provide more accurate information for load handling and/or transportation.

In some examples, moment sensing is possible via system 100. Moments can be defined with respect to a fixed reference point, as they deal with physical quantities located at some distance relative to that reference point. For example, the moment of force, often called torque, is the product of a force on an object and the distance from the reference point to the object. This property of the object 103 can be calculated and/or otherwise determined from sensor data transmitted to the control circuitry 122, as disclosed herein.

Zone Monitoring

In some examples, the system 100 is configured to determine a relative stability of the system 100 and/or object 103 based on data from the attached sensors (e.g., 116, 117, 118, etc.).

Detecting the centroid of mass relative to one or more metrics of stability, such as location relative to the load handling fixtures 108 (e.g., location side-to-side on the forks, position on the forks relative to the masts 104, height of the centroid, etc.). Thus, a zone can be determined (e.g., spatially, relative to acting forces) defining parameters for stability of the system 100 and/or object 103. For example, if the control circuitry 122 determines the system 100 and/or object 103 is moving and/or has moved past a zone threshold and/or boundary, the control circuitry 122 can generate an alert and/or control one or more components of the system 100 to take corrective action. This can include lowering, angling, and/or otherwise adjusting a positon of load handling fixtures 108 to move the system 100 and/or object 103 to within the zone.

The control circuitry 122 may be configured to generate an alert signal in response to a particular determination, such as a position and/or orientation of the object 103 violates one or more threshold values (e.g., length, width, shape, etc.). The alert may be transmitted to an operator facing device (e.g., a user interface, a remote computer or controller, etc.) which provides an indication of the determination. In some examples, threshold values and/or distribution plan data are stored in a list of values 158 within the memory storage device 156, accessible to the processor 150 for analysis.

In some examples, the control circuitry 122 can measure the forces and/or changes in force along the first, second, and/or third axes. This can be done continually, periodically, or in response to a command (e.g., from an operator). The control circuitry 122 can then compare the forces and/or changes in force along the axes to one or more threshold values (e.g., amount and/or change of force in one or more axes). The control circuitry 122 can be configured to determine changes in the forces along the different axes relative to motion of the vehicle 105 as well.

In some examples, the control circuitry 122 is configured to control one or more systems (e.g., a drive mechanism, a load handling fixture, a lift carriage, etc.) to adjust one or more operating parameters in response to a determination that the changes exceed a first threshold value of the one or more threshold values. In some examples, the one or more operating parameters includes adjusting speed of the forklift, a position or orientation of the load handling fixture, or a position or orientation of the lift carriage.

Load Balancing

In some examples, loading of the vehicle 105 and/or load handling fixtures 108 can be monitored and/or optimized using center of gravity/centroid of mass data. By determining and/or recording the location of each object, pallet, and/or load and the center of gravity thereof, several things can be calculated to optimize loading (e.g., placement on the system 100, shelving, warehouse space, a shipping container, vehicle, etc.). Axle loading, container/vehicle center of gravity, load height, among others, could be calculated and/or recorded to optimize arrangement of a load. This arrangement can be informed with other data (e.g., shipping container and/or vehicle measurements) to improve fuel economy, increase container/vehicle stability, an increase in vehicle weight haulage, etc.

Data could be transmitted to the control circuitry 122 (e.g., including AI or ML systems) to calculate regulatory factors, route optimization and braking zones, acceleration, grade-limitations, among other route specific and/or vehicle information (e.g., truck/trailers, airplanes, ships, etc.). This can have specific applicability to load balancing (such as in airplanes) where vertical location information is not necessarily incorporated in object and/or loading determination, such that assumptions (e.g. full or half pallet height). Further, conventional systems are required to move objects to a dedicated center of gravity scale, typically in a fixed location in the loading area.

The disclosed system 100 is configured to provide center-of-gravity data from on-board scale sensors, including vertical dimension and/or location. Accordingly, the disclosed system provides a faster determination, using fewer dedicated resources, and results in a better optimized loading arrangement.

In some examples, the control circuitry 122 is configured to receive a weight measurement of one or more loads from the one or more sensors. A center of gravity is calculated or otherwise determined (e.g., from received load data metrics including dimensions and/or center of gravity) for each load from the one or more sensors, such that the control circuitry 122 assigns a corresponding weight and center of gravity to each load. A cargo profile is then generated for a loading area (e.g., the system 100, shelving, warehouse space, a shipping container, vehicle, etc.) based on one or more of the weight, the center of gravity, a location, size, and/or shape of each load for the particular loading area. In some examples, the loading area is a virtual loading area, the cargo profile corresponding to a pre-loading plan.

Motion Monitor-Direction Sensing

In some examples, the sensors are employed to measure forces external to the system 100 acting on the object 103. While static (e.g., not moving), such a force will be the measure of the side force which would be composed of weight from a rolled scale as well as any force being caused by the scale contacting the object 103 that is pushing side-ways on the scale. During dynamic operation (when the forklift is moving) the sensors measure dynamic forces which would have components from one or more directions (e.g., side to side, based on the external force) force and acceleration. This dynamic force can be used to calculate the acceleration (including magnitude and direction) on the object 103 and/or vehicle 105, such as from starting, stopping, and/or turning the vehicle.

In some examples, additional data is available for use in intelligent force monitoring systems (e.g. dynamic weighing) applied to AI/ML systems.

In some examples, forces are measured based on an orientation of the load handling fixtures 108 (e.g., pitched relative to the horizontal), and/or any other forces caused by contact with the object 103. In dynamic operation, the control circuitry 122 measures thrust of the vehicle 105 in motion, which would have components from end forces and/or acceleration. This thrust force can be used to calculate the acceleration of the system 100.

In some examples, the control circuitry 122 is configured to measure the forces and/or changes in force on the load along one or more axes (e.g., end-to-end, side-to-side, etc.), continually, periodically, and/or in response to a command (e.g., to calibrate the system). The forces and/or changes in force along the one or more axes are compared to one or more threshold values, as disclosed herein. A direction of the vehicle (e.g., G-force component, force vector, trend, etc.) and/or the load can then be calculated or determined based on the measured changes in the forces, such as when the changes along one or more axes exceed a threshold value.

In some examples, the control circuitry 122 is configured to determine changes in the forces along a first axis (e.g., end-to-end) or a second axis (e.g., side-to-side) relative to motion of the vehicle. In some examples, the control circuitry 122 performs a calibration operation to determine an initial location, height, weight, or center of gravity for the load based on the changes to the forces.

Angle Compensation

In some examples, weight is calculated or otherwise determined based on sensor data corresponding to a vertical force component. The weight can be corrected, such as when the load handling fixtures 108 become tipped or otherwise angled (either forward/backward or left/right) due to pitching of the mast 104 and/or moving on an unleveled surface. Such a correction is determined by measuring the roll and pitch angles (via the one or more sensors) and calculating a correction factor. In some examples, a dedicated pitch angle sensor (as seen in conventional systems) could be made unnecessary by measuring the various forces and calculating the root sums square of one or more force components. A roll angle sensor could similarly be made unnecessary by measuring a lateral force. By measuring such forces with integrated sensors as disclosed herein, the system 100 provides improved accuracy and faster, more responsive dynamic weighing, all at a lower cost than conventional systems.

In some examples, the system 100 is configured to adjust a position or orientation of an object on the load mounting fixtures 108 by a predetermined amount as determined by the control circuitry 122. For example, each sensor is configured to measure forces and/or changes in forces along multiple axes in response to the adjustment. The predetermined amount may be calculated based on a baseline number (associated with the vehicle and/or the object) and/or in during a calibration operation.

In some examples, the control circuitry 122 is configured to determine a weight value based on the measurements corresponding to the vertical axis. The forces and/or changes in force along the horizontal axis are compared to one or more horizontal threshold values. Based on the forces and/or changes in force along the horizontal axis exceeding one or more horizontal threshold values, the control circuitry 122 determines a geometric sum (e.g., value, percentage, correction factor, etc.) for the vertical axis. Once determined, the sum can be applied to the weight value to calculate a corrected weight value.

Figure 2:
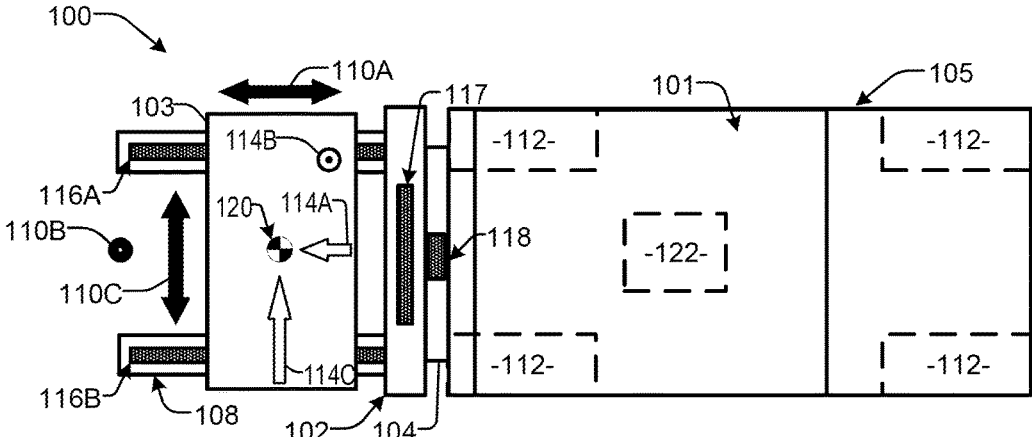
FIG. 2 is an overhead view of the diagrammatic illustration of the example measurement system for a vehicle shown in FIG. 1, in accordance with aspects of this disclosure.

FIG. 2 illustrates a partial overhead (e.g., top) view of example onboard measurement system 100, in accordance with aspects of this disclosure. In the example of FIG. 2, the system 100 is incorporated with vehicle 105, which includes one or more of a lift truck carriage 104, a lift truck carriage mount 102, and one or more forks or load handling fixtures 108 to support and/or manipulate the load 103. A chassis 101 supports the vehicle components via one or more wheels 112. An operator can command the lift truck to perform an object measuring operation by controlling the system to raise, lower, turn, angle, pitch, and/or otherwise manipulate the object, freight, and/or load (e.g., object 103).

Figure 3:
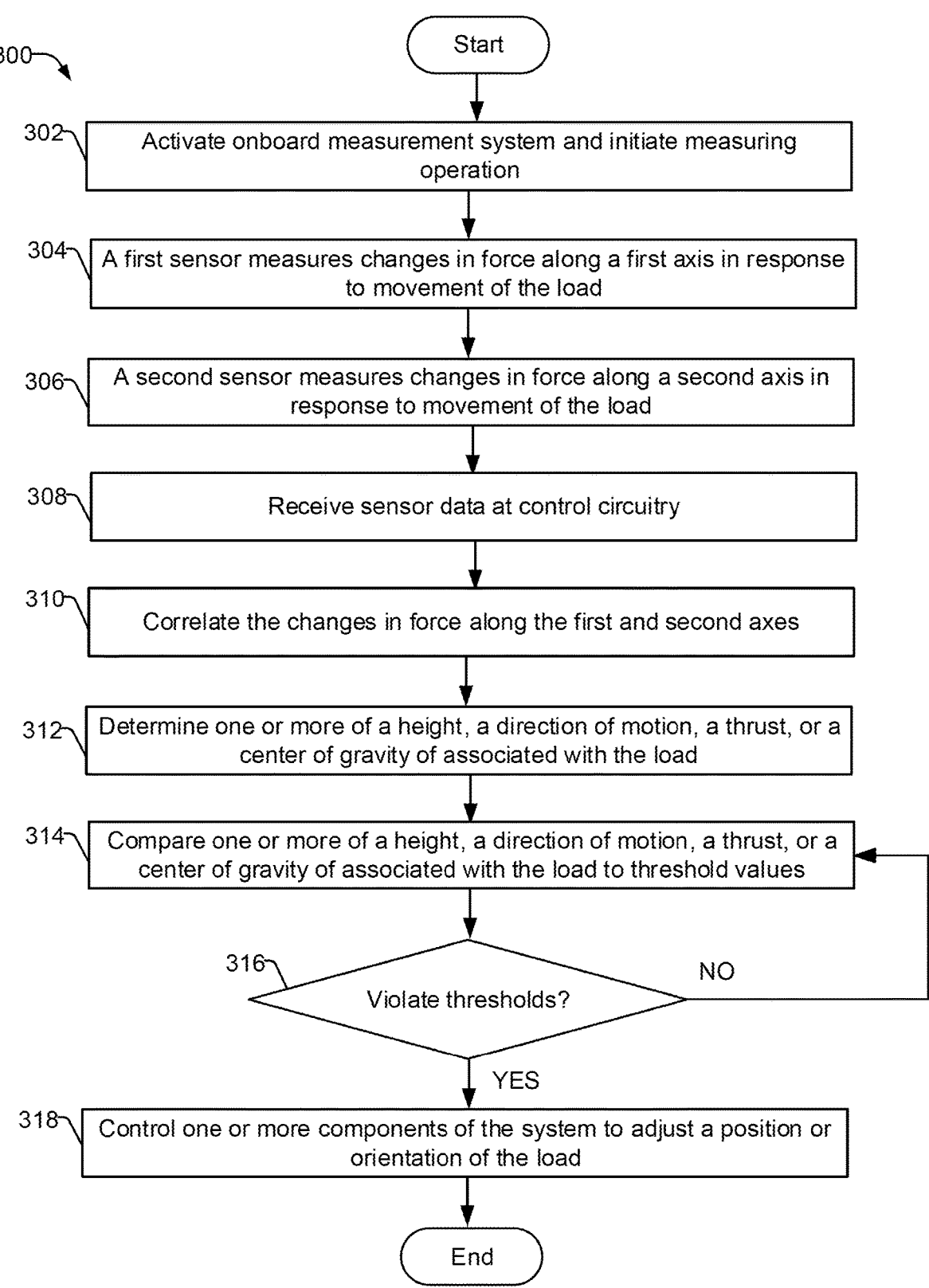
FIG. 3 illustrates an example flow chart of implementing an object measurement system for a vehicle, in accordance with aspects of this disclosure.

FIG. 3 is a flowchart representative of the program 300. For example, the program 300 may be stored on a memory (e.g., memory circuitry 156) linked to processor (e.g., processor 150) as a set of instructions to implement an onboard measuring operation for a load (e.g., object 103) on a vehicle (e.g., vehicle 105) via associated circuitry (e.g., control circuitry 122), as disclosed herein.

At block 302, the program 300 activates an onboard measurement system for a vehicle and initiates a measuring operation, such as in response to a user input (e.g., a command to initiate the operation, a calibration process), a sensor input (e.g., a motion and/or weight sensor 116, 117, 188), etc. At block 304, a first sensor measures forces and/or changes in force along a first axis (which may be a static load measurement and/or in response to movement of the load).

At block 306, a second sensor measures forces and/or changes in force along a second axis (which may be a static load measurement and/or in response to movement of the load). At block 308, data from the first sensor corresponding to forces and/or changes in force in the first and second axes are received at the control circuitry;

At block 310, the control circuitry correlates the forces and/or changes in force along the first and second axes. Based on the correlation, the control circuitry determines one or more of a height, a direction of motion, a thrust, or a center of gravity associated with the load at block 312.

In some examples, as shown in block 314 the determined one or more of a direction of motion, a thrust, or a position of center of gravity in one or more of three axes associated with the load is compared against one or more threshold values. If the determined one or more of a direction of motion, a thrust, or a center of gravity associated with the load does not violate the one or more threshold values, as provided in block 316, the program returns to block 314. If the determined one or more of a direction of motion, a thrust, or a center of gravity associated with the load does violate the one or more threshold values, the program progresses to block 318

In block 318, the control circuitry controls one or more components of the system to adjust a position or orientation of the load by a predetermined amount.

In some examples, the object may be transported on a support or surface (such as a pallet), which can be used as additional data for determining forces acting on the load or object. A direction of motion, a thrust, or a center of gravity of associated with the load can be transmitted to another system (e.g., remote computer 166) or presented to a user (e.g., via interface 154). The program may end, continue in a loop, and/or activate periodically to initiate a measuring operation.

In some examples the sensors 116, 117,118 operate in concert (e.g., the respective sensors are employed simultaneously, in turn, and/or measure a common surface and/or feature), such that measurements from each sensor may be provided to a processor 150 to calculate an accurate force measurements associated with the object 103.

Figure 4:
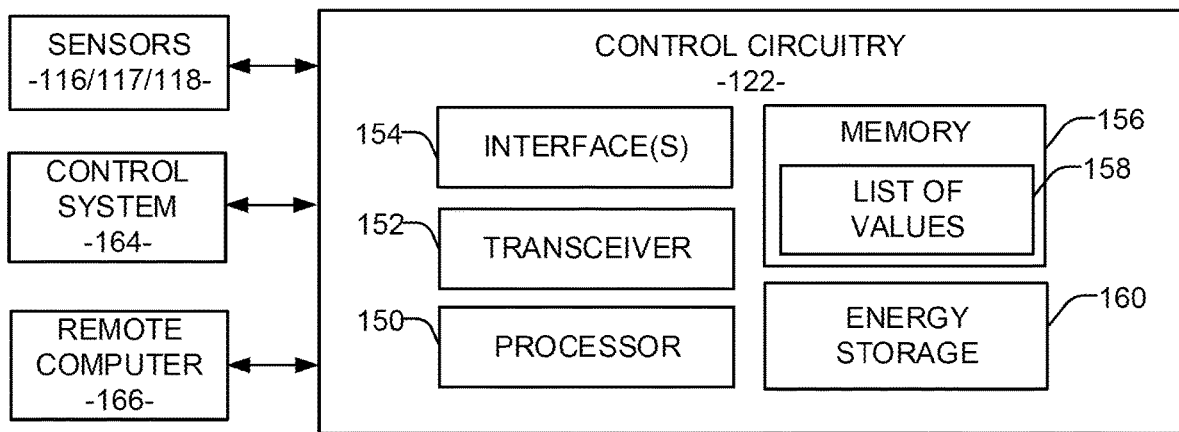
FIG. 4 is a diagrammatic illustration of an example control circuitry, in accordance with aspects of this disclosure.

As provided herein, sensor data corresponding to an object property is provided to the control circuitry 122 and/or another computing platform (e.g., remote computer or system 166) for analysis, display, recordation, display, etc. As shown in the example of FIG. 4, a processor 150 can be configured to receive and translate information from the one or more sensors 116, 117, 118 into a digital and/or computer readable format, for analysis (e.g., via processor 150), display to an operator (e.g., via an interface 154), to store in memory (e.g., memory storage device 156), and/or transmission to another computing platform 166, such as a remote computer and/or central repository. In some examples, the sensors 116, 117, 118 may include a wired and/or wireless transceiver to transmit information to another device for processing. The processor 150 that receives the output is capable of determining one or more properties of the object based on sensor data received from the sensors 116, 117, 118. The control circuitry 122 and/or the processor 150 is capable of executing computer readable instructions, and may be a general-purpose computer, a laptop computer, a tablet computer, a mobile device, a server, and/or any other type of computing device integrated or remote to the system 100. In some examples, the control circuitry 122 is implemented in a cloud computing environment, on one or more physical machines, and/or on one or more virtual machines.

In examples, sensors 116, 117, 118 are one or more of a strain gauge, a capacitive sensor, an inductive sensor, a hall effect sensor, a radar system, an acoustic sensor, an image capture system, a laser based system, an acoustic sensor, a LIDAR system, or a microwave system, but can be some other type of sensor that provides desired sensitivity and accuracy. For example, the sensor(s) 116, 117, 118 are configured to generate a signal representative of the object property during a measuring operation and transmit that signal to a device configured to receive and analyze the signal.

For example, the sensor(s) 116, 117, 118 may be in communication with the processor 150 and/or other device to generate an output associated with a measured value (e.g., for display, to provide an audible alert, for transmission to a remote computing platform, for storage in a medium, etc.). The processor 150 is configured to parse analog or digital signals from the one or more sensors in order to generate the signal.

In some examples, the control circuitry is configured to compare the plurality of signal characteristics to a list associating signal characteristics to object properties, which can be used to calculate or estimate a force and/or changes in a force acting on the object. The control circuitry can additionally or alternatively compare the properties to a list associating properties to one or more of a position, an orientation, movement, weight, and/or an area of an object to calculate or estimate one or more properties of the object.

Generally, any number or variety of processing tools may be used, including hard electrical wiring, electrical circuitry, transistor circuitry, including semiconductors and the like.

In some examples, the memory storage device 156 may consist of one or more types of permanent and temporary data storage, such as for providing the analysis on sensor data and/or for system calibration. The memory 156 can be configured to store calibration parameters for a variety of parameters, such as sensor type, type of load, type of vehicle, and/or presence or absence of a load. The historical measurement data can correspond to, for example, operational parameters, sensor data, a user input, as well as data related to trend analysis, threshold values, profiles associated with a particular measurement process, etc., and can be stored in a comparison chart, list, library (e.g., list of values 158), etc., accessible to the processor 150. The output from the processor 150 can be displayed graphically, such as the current measurements or as a historical comparison, for instance. This process can be implemented to calibrate the system 100 (e.g., prior to implementing a measuring operation).

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

What is claimed is:

1. A measurement system for a vehicle comprising:
a first sensor configured to measure forces or changes in forces acting on a load along a first axis;
a second sensor configured to measure forces or changes in forces acting on the load along a second axis; and
control circuitry configured to:
receive data from the first sensor corresponding to the force or the changes in force in the first axis;
receive data from the second sensor corresponding to the force or the changes in force in the second axis;
correlate the forces or the changes in force along the first and second axes;
determine one or more of a direction of motion, a thrust, or a center of gravity in the first or second axes associated with the load based on the correlation;
control one or more systems to adjust one or more operating parameters in response to a determination that the changes exceed a first threshold value of one or more threshold values;
receive force measurements from the first and second sensors to determine a weight value for the one or more loads; and
determine a correction factor for the weight value based on the first sensor and the second sensor.

2. The measurement system of claim 1, wherein the first axis is orthogonal to the second axis.

3. The measurement system of claim 1, wherein the vehicle is a forklift truck.

4. The measurement system of claim 3, wherein the forklift truck is configured to:
secure the load on one or more load mounting fixtures; and
adjust a position or orientation of the load by a predetermined amount resulting in a change of force on the load, wherein each of the first and second sensors are configured to measure changes in forces along the first and second axes, respectively, in response to the adjustment.

5. The measurement system of claim 4, wherein the control circuitry is further configured:
receive the measured changes in the forces along the first and second axes; and
calculate a position of the center of gravity along the first axis or the second axis within the load based on a correlation of the measured changes.

6. The measurement system of claim 1, further comprising a third sensor configured to measure changes in force along a third axis, wherein the third axis is orthogonal to both the first axis and the second axis.

7. The measurement system of claim 1, wherein the control circuitry is further configured to:
measure the changes in force along the first and second axes continually, periodically, or in response to a command; and
compare the changes in force along the first axis or the second axis to the one or more threshold values.

8. The measurement system of claim 1, wherein the vehicle is a forklift truck, and wherein the one or more systems includes a drive mechanism, a load handling fixture, or a lift carriage.

9. The measurement system of claim 8, wherein the one or more operating parameters includes adjusting speed of the forklift, a position or orientation of the load handling fixture, or a position or orientation of the lift carriage.

10. The measurement system of claim 1, wherein the control circuitry is further configured to determine changes in the forces along the first axis or the second axis relative to motion of the vehicle.

11. The measurement system of claim 1, wherein the control circuitry is configured to determine the correction factor for the weight value without using a pitch angle sensor, without using a roll angle sensor, or both.

12. The measurement system of claim 11, wherein the control circuitry is configured to determine the correction factor for the weight value without using a pitch angle sensor.

13. The measurement system of claim 11, wherein the control circuitry is configured to determine the correction factor for the weight value without using a roll angle sensor.

\*    \*    \*    \*    \*